March 14, 1933.  A. J. LEWIS  1,901,459
MACHINE FOR MAKING AND ASSEMBLING A VALVE PIN AND VALVE GASKET SUPPORT
Filed June 29, 1929  5 Sheets-Sheet 2
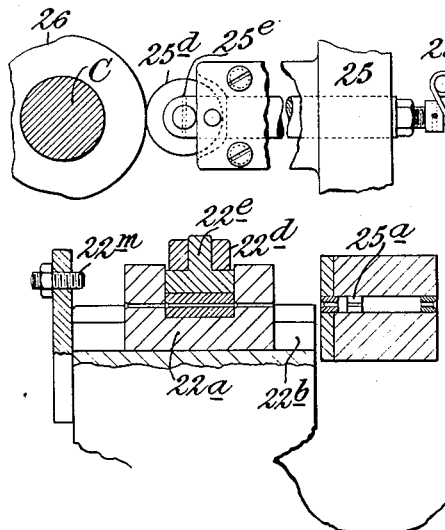
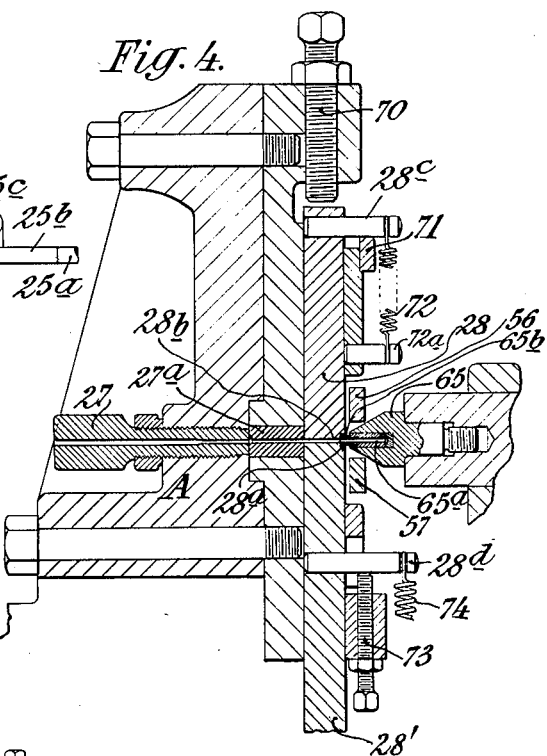
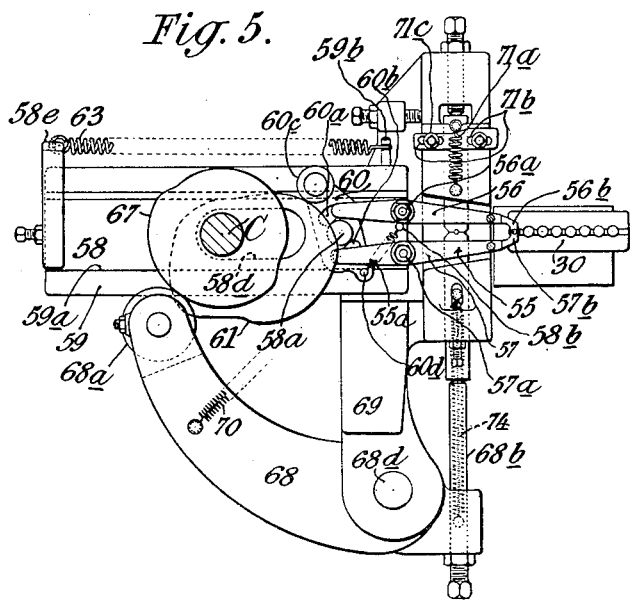
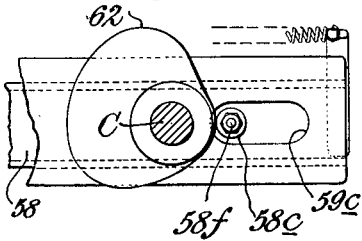
INVENTOR
Arthur J. Lewis,
By Attorneys,
Fraser, Myers & Manley.

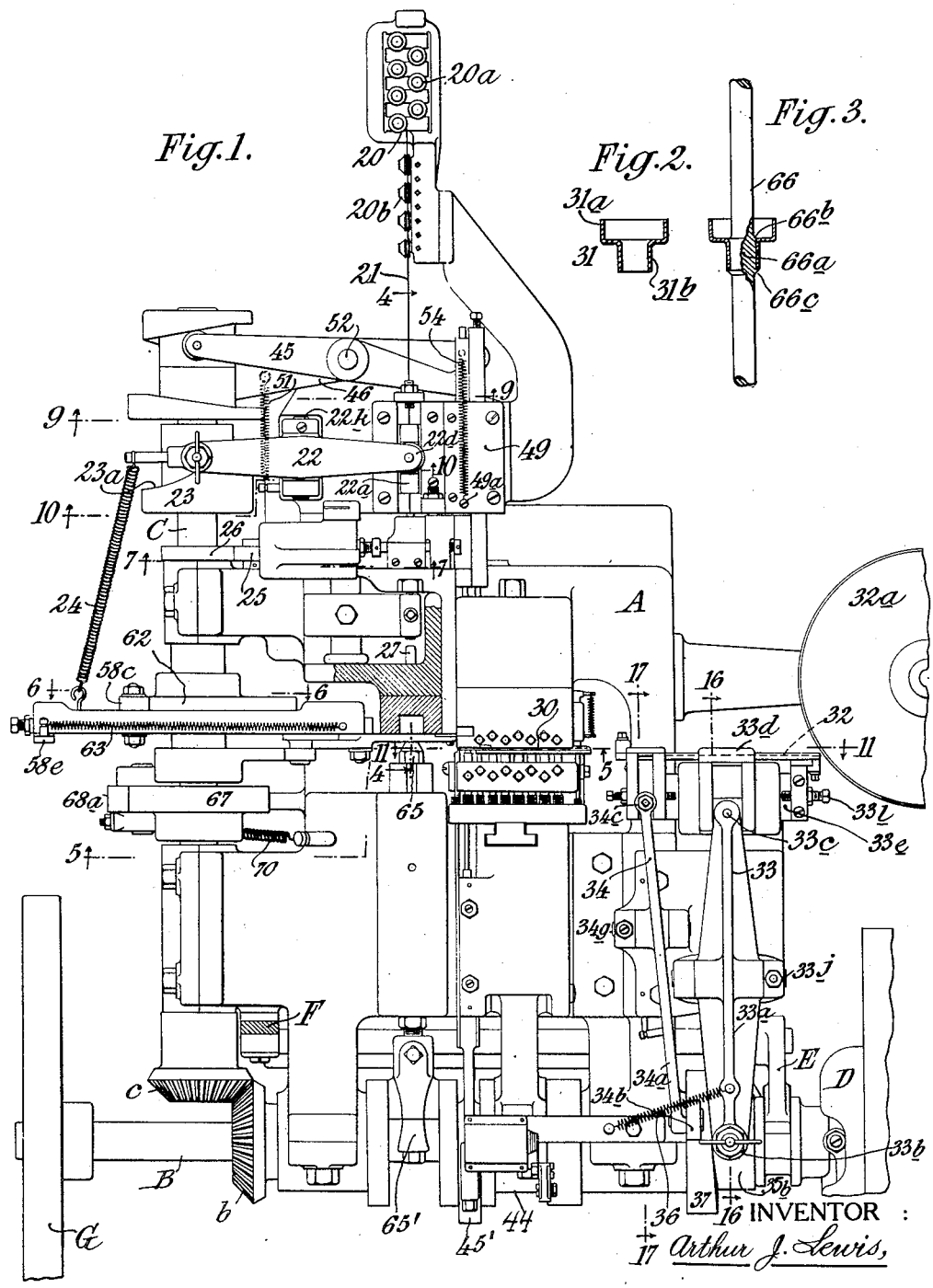

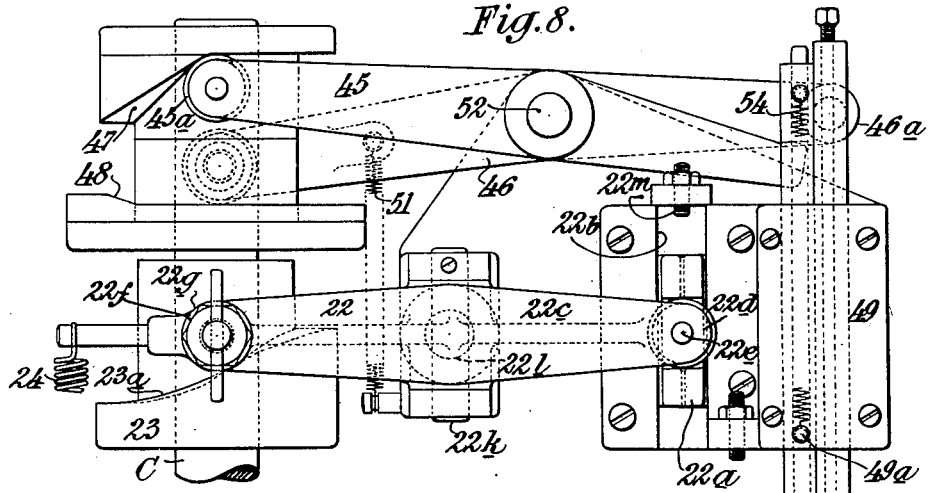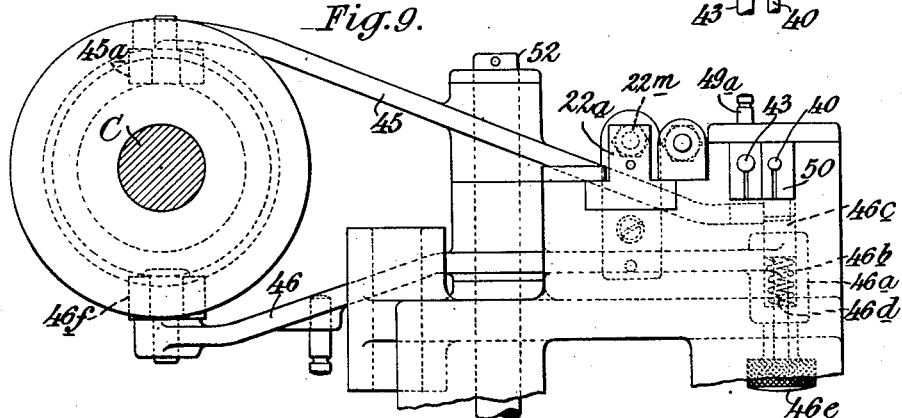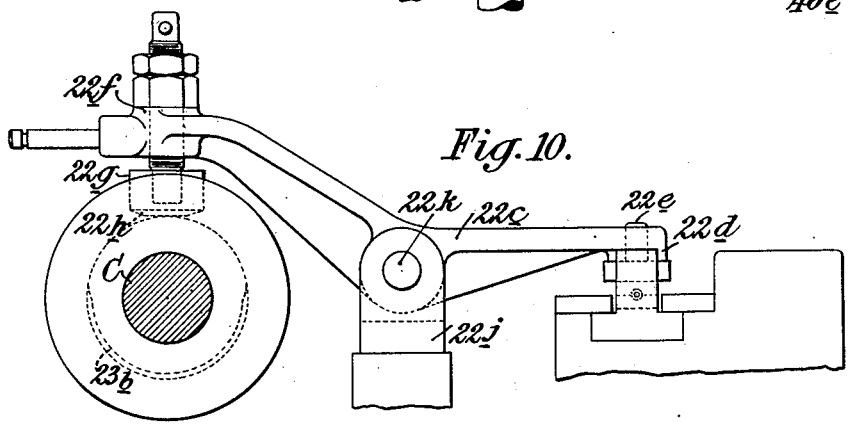

March 14, 1933.   A. J. LEWIS   1,901,459
MACHINE FOR MAKING AND ASSEMBLING A VALVE PIN AND VALVE GASKET SUPPORT
Filed June 29, 1929   5 Sheets-Sheet 4
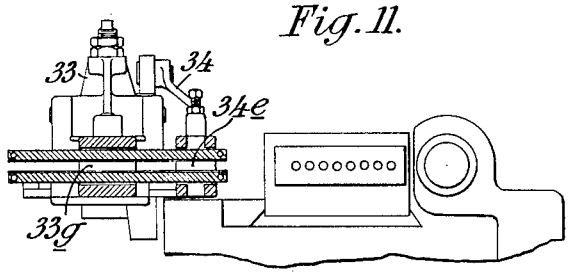
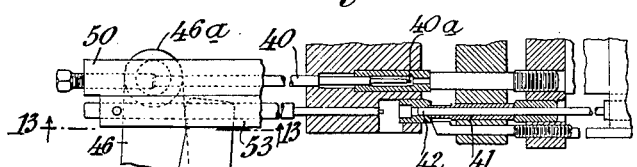
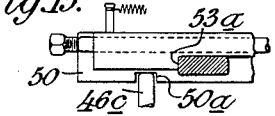
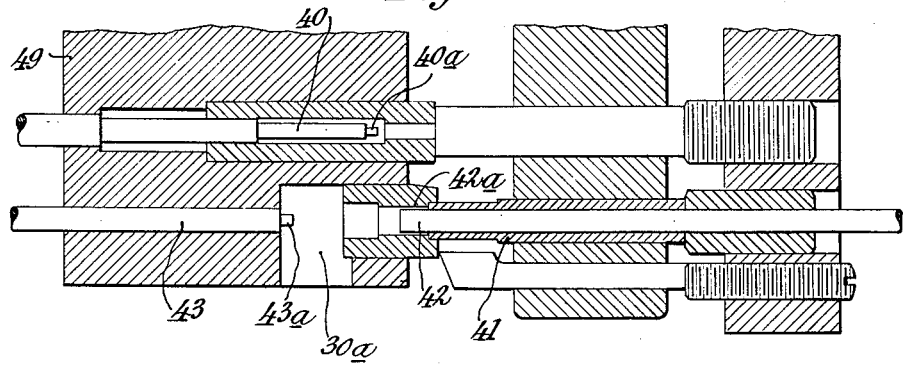
INVENTOR
Arthur J. Lewis,
BY
Fraser, Myers & Manley.
ATTORNEYS.

Patented Mar. 14, 1933

1,901,459

UNITED STATES PATENT OFFICE

ARTHUR J. LEWIS, OF STRATFORD, CONNECTICUT, ASSIGNOR TO A. SCHRADER'S SON, INC., OF NEW YORK, N. Y., A CORPORATION OF NEW YORK

MACHINE FOR MAKING AND ASSEMBLING A VALVE PIN AND VALVE GASKET SUPPORT

Application filed June 29, 1929. Serial No. 374,782.

This invention relates to a machine for and method of making and assembling the valve pin and the valve gasket support or plunger cup of a pneumatic tire valve inside.

Heretofore the valve pin and the plunger cup were made on separate machines and assembled on a third machine, and although these operations were performed with a high degree of efficiency, means were sought for lowering the manufacturing cost of these parts. A preferred means of accomplishing this is embodied in the present invention, according to which a single machine replaces the three machines formerly employed, and therefore not only saves factory floor space and reduces the operating cost, but also speeds up the production of said assembled parts. The invention will best be understood by reference to the following description of an operative embodiment thereof, taken in connection with the accompanying drawings, wherein, Fig. 1 is a top plan view with parts shown in section of a machine embodying the present invention.

Fig. 2 is a longitudinal section of a plunger cup or valve gasket supporting element constituting one of the elements formed and assembled by the machine of the present invention.

Fig. 3 is an elevation of a valve pin formed by a machine of the present invention, showing the plunger cup in section assembled on said pin.

Figs. 4 to 7 are sections taken respectively along the planes of the lines 4—4, 5—5, 6—6 and 7—7 of Fig. 1.

Fig. 8 is an enlarged top plan view of a detail of the invention shown in Fig. 1.

Figs. 9 to 11 are sections taken respectively along the planes of lines 9—9, 10—10 and 11—11 of Fig. 1.

Fig. 12 is an enlarged top plan of a portion of Fig. 1 showing a detail of the invention, parts of said detail being shown in section.

Fig. 13 is a section taken substantially along the plane of the line 13—13 of Fig. 12.

Fig. 14 is an enlarged view of the right hand portion of Fig. 12.

Figure 16:
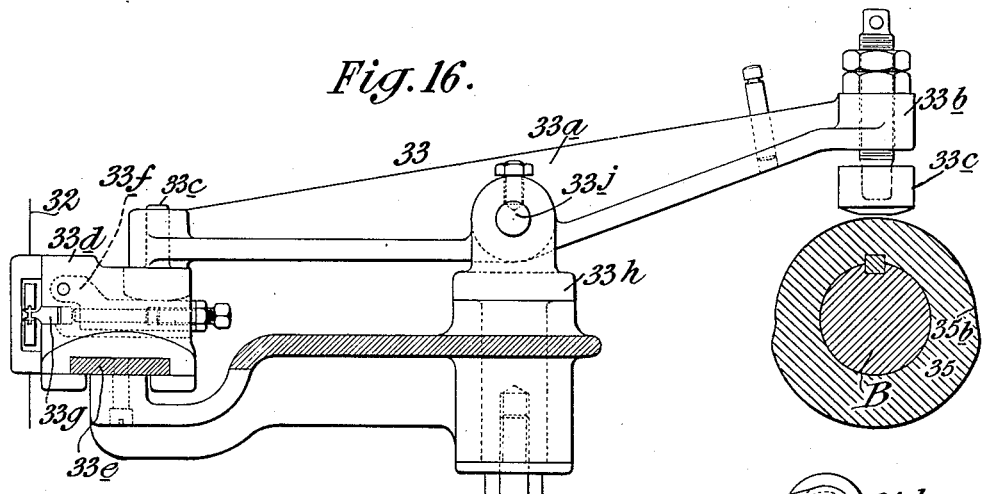
Figure 17:
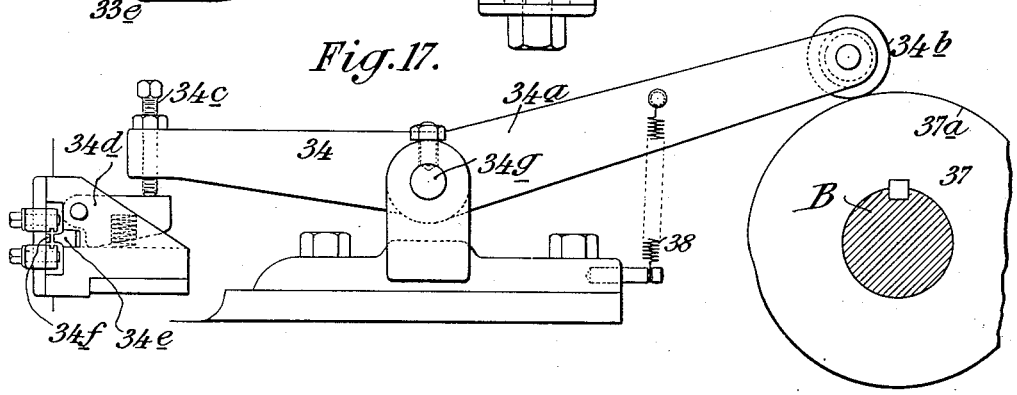

Figs. 16 and 17 are sections taken respectively along the planes of the lines 16—16 and 17—17 of Fig. 1.

Referring to the drawings, the machine of the present invention may be said to consist of the following principal mechanisms: A pin-forming mechanism, a perforated cup forming mechanism, transfer means for transferring the perforated cup from the forming mechanism into alignment with the line of feed of wire of the pin-forming mechanism, and means for assembling and rivetting the cup upon the pin. The various instrumentalities enumerated are suitably supported upon a frame A, upon which is mounted a primary driving shaft B, a secondary driving shaft C disposed at right-angles to the shaft B and driven thereby through the medium of the miter-gears $b$ and $c$, the primary shaft B being driven by a suitable source of power, such as a motor D, and controlled through suitable clutch means E operable by an upright lever F. For rotating the shafts B and C independently of the motor, for example, when it is desired to examine or make adjustments of the mechanism, a hand wheel G is provided.

The pin-forming mechanism may be of any preferred construction, and as herein embodied, comprises wire straightening and tensioning means indicated generally by the reference numeral 20 around the elements $20a$, $20b$, of which, wire 21 supplied from a coil (not shown) is fed. The wire 21 is threaded through suitable guides in the pin-forming mechanism and is given an intermittent longitudinal movement through the machine by the wire feed means 22, which, as best shown in Figs. 4, 8 and 10, consists of a slidable block $22a$ slidable in a groove $22b$ through the medium of cam-operated lever $22c$, one end $22d$ of which is pivoted to a clamping stud $22e$, and the other end of which $22f$ carries a roller $22g$ held in rolling contact with the surface $23a$ of a cam 23, mounted upon secondary shaft C, through the medium of a spring 24. The underside 22h of the roller bears upon a second cam surface 23b of the cam 23. The cam lever 22c is mounted intermediate its ends upon a stud 22j so as to pivot both about a horizontal axis 22k and a vertical axis 22l. It will thus be seen that upon rotation of the cam 23 the lever 22c is moved by virtue of the engagement between the roller 22g and cam surface 23a to move the slide block 22a within the groove 22b; and by virtue of the engagement of the underside 22h of the roller 22g with the cam surface 23b moves the stud 22e into clamping engagement with the wire. The cam surfaces 23a and 23b are so related that as the slide block 22a is moved rearwardly, the clamping stud 22e releases the wire, and as the slide block 22a is moved forward the stud 22e clamps the wire to move it forwardly. For controlling and carefully adjusting the length of movement of the wire with each stroke of the slide block A, an adjusting screw 22m is provided.

For holding the wire against rearward movement as the slide block 22a is moved rearwardly, clamping means 25 are provided. As best shown in Fig. 7, these clamping means consist of an anvil die 25a, a movable clamping jaw 25b normally held out of contact with the anvil by a coil spring 25c and adapted to be moved into clamping engagement with the wire by a roller 25d carried by the rear end of the clamping jaw supporting element 25e, said roller 25d being adapted to be moved by a cam 26 mounted on the shaft C. Obviously the timing of the movement of the jaw 25b is such as to hold the wire in clamped relation during the interval that the clamping means on the wire feed are in unclamped relation to the wire.

After passing through the clamping means 25 the wire is guided through a tubular member 27 carried by the machine frame A, and then passes through a quill 27a, at the front face of which the wire is severed by the cut-off dies 28, 28' in a manner to be hereinafter more fully explained.

The perforated cup forming mechanism comprises a gang of shaping, piercing and blanking dies 30 of a character to provide a cup-shaped element 31, as shown in Fig. 2 of the drawings. The shaping and piercing dies of this gang of dies may be of any preferred or conventional construction, but the blanking die herein is believed to be novel in construction and operation, as will be presently made apparent. The strap metal 32 from which the cups 31 are formed may be in the form of a roll mounted upon the stand 32a and adapted to be intermittently fed to the gang of dies by the strap metal feeding means 33 and clamping means 34.

Figure 15:
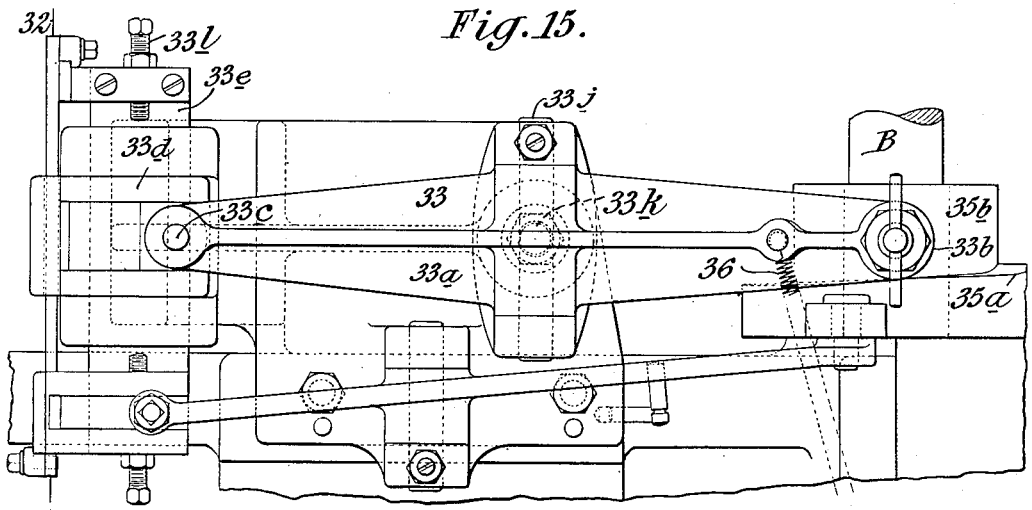
Fig. 15 is an enlarged top plan view of a portion of Fig. 1, showing the strap metal feeding means.

The strap metal feeding means may be of any preferred construction, and as herein shown by way of example, are somewhat analogous to the wire feeding means 22, and as best shown in Figs. 15 and 16 consists of a lever 33a, one end of which 33b carries a roller 33c in rolling contact with the cam surface 35a of a cam 35, mounted upon the shaft B, through the medium of a spring 36, and the underside of the roller 33c being in contact with the cam surface 35b. The opposite end of the lever 33a is pivotally connected to a stud 33c fitted within a slide block 33d movable over a guide track 33e, the stud 33c resting upon one end of a pivoted lever 33f which cooperates with a separately formed clamping jaw 33g to clamp the strap metal 32. The lever 33a intermediate its ends is mounted upon a support 33h in a manner to permit said lever to pivot about a horizontal axis 33j and about a vertical axis 33k. It will thus be apparent that the strap metal 32 is given an intermittent forward movement analogous to that explained in conjunction with the feed wire 21, excepting that instead of the clamping action taking place directly through a clamping stud connected to one end of the lever, in the strap metal feed such clamping action functions through a secondary pivoted lever 33f and a clamping jaw 33g. To control the amplitude of movement of the slide block 33d, or, in other words, the length of metal intermittently fed, adjustable stop means 33l are provided.

The strap metal clamping means 34 which serves to clamp the metal 32 during the intervals that the clamping element of the feeding means 33 is released from clamping engagement with the metal, consists, as best shown in Fig. 17, of a lever 34a, one end of which carries a roller 34b held in contact with the cam surface 37a of a cam 37 mounted upon the shaft B, through the medium of a tension spring 38. The opposite end of said lever is provided with a set screw 34c adapted to contact with one end of a pivoted lever 34d, which, in turn, coacts with a clamping jaw 34e to clamp the strap metal 32 against an anvil 34f. The lever 34a intermediate its ends is pivotally mounted upon a horizontal stud 34g. From the construction of the clamping means 34 just described, it will be apparent that as the roller 34b passes over the high spot of the cam 37a, the lever 34d presses the clamping jaw 34e against the metal to clamp the same; and as the roller passes over the low portion of the cam, the spring 38 will cause the set screw 34c to withdraw its pressure from the lever 34d, whereupon the clamping jaw 34e will permit the metal to pass between it and its anvil 34f when acted upon by the feed means 33.

The strap metal 32 as it is intermittently fed through the gang of dies 30, is successively acted upon by the shaping, piercing and blanking dies to form a cup-like element comprising a cup portion 31a and a tubular extension 31b, as shown in Fig. 2. The first four dies of the gang are shaping dies which form a nipple-like projection in the metal. The next die perforates the tip of the nipple, while the succeeding die, in cooperation with a squaring rod 40, squares the end of the tubular extension thus formed. The operation of the squaring rod 40 will be presently explained. Following the squaring operation the tubular extension is blanked out with a supporting disc, which disc is subsequently cupped, said blanking out and cupping operation being performed by two independently-operable, concentric punches 41 and 42 and a movable transfer rod 43. The gang of dies, with the exception of squaring rod 40, punch 42 and transfer rod 43, are operable as a unit by an eccentric 44 mounted upon shaft B. Cupping punch 42 is independently operable by an eccentric 45' mounted on shaft B. The squaring rod 40 and transfer rod 43 are operable from shaft C through the medium of pivoted levers 45 and 46, which are respectively controlled by cams 47 and 48.

As will best be seen from an inspection of Figs. 8, 9, 12, 13 and 14, the movement of the squaring rod 40, which is formed at its squaring end with a nipple 40a which is adapted to be moved into the tubular extension 31b of the blank after being pierced, is reciprocable within a suitable slideway formed in a block 49, mounted upon the frame A, through the medium of lever 46, one end 46a of which is formed with a vertical recess or cavity 46b, within which seats one end of a plug 46c, the opposite end of which extends into a recess 50a in the underside of a member 50, to which the squaring rod is affixed. Within the recess 46b there is provided a coil spring 46d which normally presses upwardly against the plug 46c to hold it within the recess 50a. For varying the compression of the spring 46d there is provided a thumb screw 46e. The opposite end of the lever 46 carries a roller 46f which is held in contact with the cam surface 48 through the medium of a tension spring 51. Intermediate its ends the lever 46 is mounted for pivotal or rocking movement about a vertical stud 52.

The lever 45 is also pivoted intermediate its ends about stud 52 and at one end engages within an undercut recess 53a formed in the member 53 which carries the transfer rod 43; the opposite end of the lever 45 being provided with a roller 45a for engagement with the cam surface 47, and is held in such engagement through the action of a tension spring 54, one end of which is anchored on the carrying member 53, and the other end of which is anchored to a stud 49a on the guide block 49.

The timed relation of the movements of the punches 41 and 42 and the transfer rod 43 with its nipple end 43a is such that as the blanking punch 41 blanks out the disc which supports the tubular extension 31b the nipple 43a will be within said tubular extension. After the blanking out operation, as the blanking punch 41 is being withdrawn, the cupping punch 42 is moved forward to cup the disc around the end of said punch to form the cup portion 31a, the inner wall of the female die 42a providing the confining wall for the cup. The cupping punch and transfer rod then simultaneously move to the left to a position where the formed cup is held within the enlarged recess 30a to be grasped by transfer means 55, whereupon the cupping punch 42 and transfer rod 43 move in opposite directions to release the formed cup.

The transfer means 55 are adapted to physically transfer the formed perforated cup 31 from the cup forming mechanism and align the tubular portion of said cup with the line of feed of wire 21 and hold the cup in said position until the wire is passed therethrough. The transfer means 55 consist of a pair of fingers or gripping elements 56, 57, which are pivotally mounted intermediate their ends at 56a, 57a, respectively, to a slidable member 58 which is slidable or movable within a slideway 59a in a member 59 fixed upon the frame A. The gripping ends 56b, 57b of the gripping elements are recessed so that when in closing position they are adapted to engage around the cup 31 to grip the same. The opposite ends of the gripping elements each carries an angular lug or projection which engages in the cam grooves 60a and 60b respectively, of a member 60 which is rockably mounted upon a stud 58a carried by the slidable member 58. Member 60 at one end carries a roller 60c adapted to contact with the surface of a cam 61 mounted on the shaft C. The gripping ends of the pivotally mounted fingers or gripping elements 56, 57 are normally held in closed or gripping position through the medium of a tension spring 55a, one end of which is anchored to the slidable member 58 at 58b, and the other end of which is anchored to the end 60d of the rockable member 60, so that the ends of the gripping fingers will be held in the ends of the cam grooves 60a and 60b which are farthest away from the pivotal center of the member 60. When the roller 60c engages the high spot of the cam 61, the member 60 is moved about its pivot against the tension of the spring 55a to open the gripping ends 56a, 57b of the fingers.

The slidable member 58 carries a roller 58c adapted to be engaged by the surface of a cam 62 mounted on the shaft C and movable by said cam toward the left when viewed in Fig. 1, and to the right in Fig. 6. To permit of such movement, the member 58 is formed with an elongated slot 58d which provides a clearance for the shaft C which also passes through the slidable member 58. To move the slidable member toward the right when viewed in Figs. 1 and 5, a tension spring 63 is provided, one end of which is anchored at 59b to the member 59, which is rigid with the frame A; and the other end of the spring is anchored to an upright lug or projection 58e carried by the end of the slidable member 58. To allow for movement of the stud 58f upon which the roller 58c is mounted, relatively to the member 59 when the slidable member 58 slides therein, the member 59 is provided with an elongated slot 59c, as best seen in Fig. 6.

From the description of parts 55 to 63 it will be apparent that as the shaft C is rotated, the gripping ends of the gripping elements are alternately moved from a position of gripping engagement with the formed cup to a point where the axis of such formed cup will be in alignment with the line of feed of wire of the pin-forming mechanism; and that said gripping ends are likewise alternately closed and opened to grasp and release the formed cup at the proper stations. It will, of course, be understood that inasmuch as the movements of the gripping elements are entirely cam-controlled, the cams will be so shaped as to cause said gripping members to accurately cooperate with the intermittent feed movements of both the pin-forming and cup-forming mechanisms.

After a formed cup is presented into axial alignment with the line of feed of wire through the medium of the transfer or gripping fingers, the end of the wire is moved through said cup a predetermined distance, the gripping fingers release the cup, the wire is clamped by the cut-off dies 28, 28' as they are moved upwardly by a rod 68b under the influence of a lever 68 which is pivotally mounted in a depending supporting lug 69 as a roller 68a carried by the lever 68 rides over the high spot of a cam 67 mounted on shaft C, whereupon the header 65, controlled by an eccentric 65', is moved inwardly to rivet the cup upon the wire. To accomplish this, the header 65 comprises a die formed with a central bore 65a having a depth of slightly less length than the projection of wire which has passed through the cup, and a reduced tip or end 65b of a diameter to fit within the cup portion of the cup. For complemental action with the header die the anvil die, which is formed within the cut-off dies 28, 28', is provided with a cup-shaped recess 28a for accommodating the cup portion 31a of the perforated cup and has its bore 28b immediately adjacent to said cup portion 28a somewhat enlarged for a length slightly in excess of the length of the tubular extension 31b of the cup member to accommodate said tubular extension. The interior diameter of the tubular extension is made slightly larger than the diameter of the pin, in view of which it will be appreciated that because of the slight differences in the lengths of the tubular extension on the cup and its receiving bore in the die; the internal diameter of the tubular extension and the diameter of the pin; and the length of exposed pin and depth of the bore 65a in the header die, that upon the header die being moved down over the pin, the excess in metal provided by the difference in length between the exposed end of the wire and the depth of the bore in the header die will be caused to flow to fill up the bore of the tubular extension 31b, and also form enlarged heads at the opposite ends of said tubular extension. As the illustration in Fig. 4 is too small to show these details they have been illustrated in the completed pin shown in Fig. 3, wherein the pin 66 has an enlarged diameter 66a intermediate its ends for a length corresponding to the length of the tubular extension 31b of the perforated cup, and has portions of its enlarged diameter riveted over the ends of the tubular extension 31b, as shown at 66b and 66c. This method of assembling a cup on a pin, it will be noted, provides a joint in spaced relation to the normal diameter of the pin, which joint will be bridged and sealed by a packing washer which is seated within the cup 31a.

After the rivetting operation the wire is severed by the cutting dies 28, 28' as they move downwardly, when the roller 68a moves over the low or dwell of cam 67. To hold the roller 68a in engagement with the cam 67 there is provided a tension spring 70, one end of which is anchored to the frame, as best shown in Fig. 1.

To insure the accurate functioning of the cut-off dies 28, 28', suitable guiding and limiting stop means are provided. As best shown in Figs. 4 and 5, upward movement of the dies 28, 28' is limited by an adjustable set screw 70, while downward movement of die section 28 is limited by a transverse stop member 71 adapted to engage a projecting pin 28c carried by said die section which is normally urged downwardly by a tension spring 72, one end of which is anchored to the pin 28c, and the other end of which is anchored to a pin 72a carried by the frame A. For variably adjusting the downward movement of the die section 28, the stop 71 is formed with an inclined top surface 71a and elongated lateral slots 71b through which clamping screws 71c pass and engage in the frame A. Upward movement of the lower die section 28' it will be appreciated, will be limited by the movement of the upper die section 28 with which it is held in contact. Downward movement of the lower die section 28' is limited by an adjustable set screw 73 against which the projecting pin 28d is adapted to bear. A tension spring 74 has one end anchored to the pin 28d and its other end anchored to a projection on the lever 68c, which spring holds the lower die section against the top of the set screw 73.

In the operation of the machine wire 21 and metal strap 32 are intermittently simultaneously fed to the pin-forming and perforated cup forming mechanisms respectively. As a cup is completed it is grasped by the transfer fingers 55 and physically transferred to the line of feed of wire of the pin-forming mechanism, whereupon the pin is passed through the tubular extension of the cup, the cup is thereupon riveted upon the pin and the pin severed from the wire, all in a manner as hereinbefore more fully explained.

While I have shown and described a preferred embodiment of my invention, it is to be understood that I do not wish to be limited to the details of construction set forth, as modifications in various elements of the mechanisms may be resorted to without departing from the spirit of the invention.

What I claim is:

1. A machine of the class described, comprising a straight pin-forming mechanism, a perforated cup forming mechanism, means for transferring a perforated cup from its forming mechanism and axially aligning said cup with a pin, and means for assembling and rivetting said cup on said pin.

2. A machine of the class described, comprising a pin-forming mechanism, a mechanism for forming a cup having a tubular extension, means for transferring the formed cup and axially aligning the tubular portion thereof with a pin, and means for assembling the cup on said pin and rivetting the pin over the ends of the tubular extension.

3. A machine of the class described, comprising a pin-forming mechanism, a mechanism for forming a cup having a tubular extension, means for transferring the formed cup and axially aligning the tubular portion thereof with a pin, means for assembling the cup on said pin and means for simultaneously increasing the diameter of the pin within the tubular extension of the cup and for rivetting said enlarged portion of the pin over the ends of the tubular extension.

4. A machine of the class described, comprising a pin-forming mechanism consisting of wire feeding, clamping and cutting means, a perforated cup-forming mechanism consisting of metal strap feeding, clamping, shaping and blanking means, means for transferring a formed cup from the blanking means into axial alignment with the line of feed of the wire, and means for assembling the cup on the wire.

5. A machine of the class described, comprising a pin-forming mechanism consisting of wire feeding, clamping and cutting means, a perforated cup forming mechanism consisting of metal strap feeding, clamping, shaping and blanking means, the line of feed of the wire being at a right angle to the line of feed of the strap metal and controlled respectively from shafts disposed at right angles to each other, the perforation in the cup when formed having its axis parallel to the line of feed of the wire, means for transferring a formed cup from the blanking means into axial alignment with the line of feed of the wire, and means for assembling the cup on the wire.

6. A machine of the class described, comprising a pin-forming mechanism, a perforated cup forming mechanism and means comprising a pair of pivotally-mounted fingers which are operable for grasping a cup after it is formed and transferring it into axial alignment with the line of feed of the wire of the pin-forming mechanism.

7. A machine of the class described, comprising a pin-forming mechanism, a perforated cup forming mechanism and means comprising a slidable member, a pair of pivotally-mounted fingers mounted on said slidable member and adapted in one position of the slidable member for grasping a cup after it is formed, and in another position of the slidable member for holding said cup in position to be received upon the feed wire of the pin-forming mechanism as said wire is moved along its line of feed.

8. A machine according to claim 7, wherein the gripping ends of the fingers are normally held in closed position by spring means.

9. A machine according to claim 7, wherein the gripping ends of the fingers are normally held in closed position by spring means, and wherein the movement of the slidable member and the opening of the fingers are cam controlled.

10. A mechanism for mechanically transferring a member from one point to another, comprising a frame, a member slidable relatively to said frame, a pair of movable gripping elements pivotally carried by the slidable member and adapted to be moved to grasp the member to be transferred and to release said member, means for moving the slidable member and for operating the gripping elements thereof and spring means normally holding the gripping ends of said fingers in closed position.

11. A mechanism for mechanically transferring a member from one point to another, comprising a frame having a slideway therein, a member slidable in said slideway, a rotatable shaft passing through both said frame and said slidable member, said slidable member having an elongated opening through which the shaft passes. a pair of movable gripping elements carried by the slidable member and adapted to be moved to grasp the member to be transferred and to release said member as the slidable member is moved, and means for reciprocating the slidable member and for operating the gripping elements thereof.

12. A mechanism according to claim 10, wherein the movable gripping elements are pivotally mounted intermediate their ends upon the slidable member, and the means for operating the gripping elements is a cam-operated rockable element.

13. A mechanism according to claim 10, wherein a second element is rockably mounted on the slidable member, which second element has a pair of cam grooves, means carried by the gripping elements extending into said grooves, spring means for holding said second element in a position such that the gripping ends of the gripping elements will be normally held in closed position. a cam on the shaft for moving the slidable member in one direction. spring means for moving the slidable member in the opposite direction, and a second cam on the shaft for controlling the rocking movement of the second element to open the gripping ends of the gripping elements.

14. A machine of the class described, comprising a pin-forming mechanism. a mechanism for forming a cup having a tubular extension comprising a gang of shaping, piercing and blanking dies. a transfer rod, and means cooperating with the blanking die during the blanking out operation for positioning the formed cup upon the transfer rod.

15. A machine of the class described, comprising a pin-forming mechanism. a mechanism for forming a cup having a tubular extension comprising a gang of shaping, piercing and blanking dies. which successively first form a tubular extension in the strap metal. then blank out the tubular extension with a supporting disc. which disc is subsequently cupped. said blanking out and cupping operation being performed by two independently-operable concentric punches and a movable transfer rod. which latter receives and temporarily holds the perforated cup.

16. A machine according to claim 15, wherein the two independently-operable concentric punches are operable in timed relation from one shaft and the transfer rod is operable axially with the punches from another shaft.

17. A machine according to claim 15, wherein secondary transfer means grasp the formed cup while held by the transfer rod to transfer said cup into axial alignment with the line of feed of wire of the pin-forming mechanism, after the transfer rod moves to release the cup.

18. A machine of the class described, comprising means for assembling a tubular element upon a pin having a somewhat smaller diameter than the tubular element, and means for increasing the diameter of the pin to fit said tubular element.

19. A machine of the class described, comprising a pin forming mechanism, a mechanism for forming a tubular element having a diameter somewhat larger than the diameter of the pin, means for assembling a tubular element upon a pin and means for increasing the diameter of the pin to fit the tubular element.

20. A machine of the class described, comprising means for assembling a tubular element upon a pin having a somewhat smaller diameter than the tubular element, means for increasing the diameter of the pin to fit said tubular element and means for swaging said assembled parts into holding engagement.

21. A machine of the class described, comprising a mechanism for forming a gasket-supporting member having a disc-like portion and a tubular extension, means for assembling said gasket-supporting member upon a valve pin having a smaller diameter than that of the tubular extension, and means for increasing the diameter of the pin within the tubular extension to fit therein, whereby the joint between said parts at the disc-like portion of the supporting member will be circumferentially spaced from the normal surface of the pin.

22. A method of forming a valve pin and gasket-supporting cup assembly which comprises forming a gasket-supporting member with a disc-like portion and a central tubular extension having an inner diameter somewhat larger than the diameter of the valve pin, mounting said member upon a valve pin and uniting said parts together by increasing the diameter of the pin within the tubular extension of the supporting member to fit therein.

23. A method of forming a valve pin and gasket-supporting cup assembly which comprises forming a gasket-supporting member with a disc-like portion and a central tubular extension having an inner diameter somewhat larger than the diameter of the valve pin, mounting said member upon a valve pin and uniting said parts together by increasing the diameter of the pin within the tubular extension of the supporting member to fit therein to provide a joint between the members, which joint, at the disc-like portion of the supporting member, will be circumferentially spaced from the normal surface of the pin.

24. A method of forming a valve pin and gasket-supporting assembly which comprises forming a gasket-supporting member with a disc-like portion and a central tubular extension having an inner diameter somewhat larger than the diameter of the valve pin, mounting said member upon a valve pin and uniting said parts together by simultaneously increasing the diameter of the pin within the tubular extension of the supporting member and upsetting the enlarged portion of the pin over the ends of the tubular extension, whereby the joint between the members at the disc-like portion of the supporting member will be circumferentially spaced from the normal surface of the pin.

In witness whereof, I have hereunto signed my name.

ARTHUR J. LEWIS.